United States Patent [19]
Showalter

[11] Patent Number: 5,699,888
[45] Date of Patent: Dec. 23, 1997

[54] MODULATING CLUTCH HAVING PASSIVE TORQUE THROUGHOUT THRESHOLD

[75] Inventor: Dan J. Showalter, Plymouth, Mich.

[73] Assignee: Borg-Warner Automotive, Inc., Sterling Heights, Mich.

[21] Appl. No.: 612,616

[22] Filed: Mar. 6, 1996

[51] Int. Cl.⁶ .............................. F16D 13/04; F16D 23/00; F16D 41/00; F16D 43/00
[52] U.S. Cl. .............................. 192/35; 74/650
[58] Field of Search .............................. 74/650, 665 H; 192/35, 49, 89.22

[56] References Cited

U.S. PATENT DOCUMENTS

| | | | |
|---|---|---|---|
| 2,555,215 | 5/1951 | Warner | 192/35 |
| 2,947,393 | 8/1960 | Grover | 192/35 |
| 2,947,394 | 8/1960 | Grover | 192/35 |
| 4,681,180 | 7/1987 | Oyama et al. | 192/49 |
| 5,105,901 | 4/1992 | Watanabe et al. | 180/249 |
| 5,119,900 | 6/1992 | Watanabe et al. | 180/245 |
| 5,141,072 | 8/1992 | Shibahata | 180/245 |
| 5,152,362 | 10/1992 | Naito | 180/248 |
| 5,161,636 | 11/1992 | Haupt et al. | 74/650 |
| 5,189,930 | 3/1993 | Kameda | 192/49 |
| 5,353,889 | 10/1994 | Hamada | 180/242 |
| 5,383,378 | 1/1995 | Paul et al. | 74/650 |
| 5,398,792 | 3/1995 | Teroka | 192/35 |
| 5,417,298 | 5/1995 | Shibahata | 180/76 |
| 5,464,084 | 11/1995 | Aoki et al. | 192/35 |
| 5,479,348 | 12/1995 | Sasaki | 364/426.03 |
| 5,484,033 | 1/1996 | Frank et al. | 180/245 |
| 5,517,417 | 5/1996 | Iida | 364/426.01 |
| 5,540,119 | 7/1996 | Hudson | 192/49 |
| 5,548,513 | 8/1996 | Masuda et al. | 364/426.03 |
| 5,584,776 | 12/1996 | Weilant et al. | 192/35 |

*Primary Examiner*—Dirk Wright
*Attorney, Agent, or Firm*—Brinks Hofer Gilson & Lione; Greg Dziegielewski

[57] ABSTRACT

A modulating clutch for disposition and use in a motor vehicle drive train includes a disc pack clutch assembly and clutch actuator. The clutch actuator includes an assembly for generating compressive force which is applied to the clutch pack assembly and a preload member which partially engages the clutch pack to provide torque transfer up to a predetermined level without activation of the clutch actuator. Activation of the clutch actuator increases the torque transfer or throughput above the predetermined level. The differential of the present invention thus functions passively as a limited slip differential by allowing torques in excess of the predetermined torque level to slip each axle relative to the driveline input thereby provide a constant, minimum level torque coupling between the driveline and each axle. When the clutch actuator is energized, it may be utilized to control torque transfer at levels above the predetermined level between the input and output of the clutch mechanism. The modulating clutch of the present invention has application in vehicle differentials.

16 Claims, 3 Drawing Sheets

MODULATING CLUTCH HAVING PASSIVE TORQUE THROUGHOUT THRESHOLD

BACKGROUND OF THE INVENTION

The invention relates generally to modulating clutches for motor vehicle drivelines and more specifically to a clutch having a biasing or preloading member which establishes a predetermined maximum torque throughput without activation of the clutch operator.

Control systems and transfer cases having both electric and hydraulic modulating clutches have found broad application in adaptive vehicle drive systems. Such systems generally monitor the speeds of the front and rear drive shafts or compute such speeds by taking averages of individual readings of the two front and two rear wheels and, upon determining a speed difference between the drive shaft speeds or average speeds of the wheels, energize the modulating clutch according to a predetermined program to drive the speed difference and thus wheel slip back to zero.

Typically, such modulating clutches are physically disposed in a transfer case adjacent and driven by the output of the vehicle transmission and operably disposed between the primary and secondary drivelines. Systems exemplary of this configuration are disclosed in co-owned U.S. Pat. No. 5,407,024 granted Apr. 18, 1995 and U.S. Pat. No. 5,485,894 granted Jan. 23, 1996.

Typically, when such modulating clutches are inactive (during periods of equal drive shaft speed), they transfer either no torque from the primary driveline to the secondary driveline or a residual or minimal torque resulting merely from the internal drag of the clutch components. From a vehicle operational standpoint, such residual torque transfer is negligible and thus irrelevant. While such configurations provide exceptionally accurate torque modulation and thus prop shaft speed control when energized, they do have the drawback that until the clutch is activated or energized, substantially no torque transfer occurs. Stated somewhat differently, until or unless energy is expended to actuate the clutch, no torque transfer occurs. This is, of course, true whether the modulating clutch is disposed in a transfer case or a differential.

Given this operational rule, maintaining even a minimal, standby torque which maintains the secondary driveline components in a staged condition, that is, with all slack taken up, ready to transfer drive torque, can be accomplished only by the constant consumption of energy. In a clutch having an electromagnetic operator, this constant energization of the electromagnetic coil not only constantly consumes electrical energy but can also result in objectionable magnetization of driveline components and other proximate ferrous vehicle components which, while not deleterious, is preferably avoided.

From the foregoing, it is apparent that improvements relating to the art of modulating clutches specifically intended for use in the drivelines of motor vehicles addressing these drawbacks would be desirable.

SUMMARY OF THE INVENTION

A modulating clutch for disposition and use in a motor vehicle drive train includes a disc pack clutch assembly and clutch actuator. The clutch actuator includes an assembly for generating compressive force which is applied to the clutch pack assembly and a preload member which partially engages the clutch pack to provide torque transfer up to a predetermined level without activation of the clutch actuator. Activation of the clutch actuator increases the torque transfer or throughput above the predetermined level.

The modulating clutch of the present invention has application in vehicle differentials. The differential of the present invention thus, first of all, functions passively as a limited slip differential by allowing torques in excess of the predetermined torque level to slip each axle relative to the driveline input thereby provide a constant, maximum torque level coupling between the driveline and each axle. Second of all, when the clutch actuator is energized, it may be utilized to control torque transfer at levels above the predetermined level between the input and output of the clutch mechanism. Lastly, the clutches may be commonly or individually controlled to achieve uniform left-right or distinct left-right torque distribution.

The preloading or biasing member provides a passive maximum torque throughput which can then be increased by the activation of the clutch actuator. This torque throughput threshold is additive to the torque transfer capability of clutch actuator as the limiting factor of torque throughputs through such a modulating clutch is the amount of compressive force generated by the clutch operator, not the torque throughput capability of the clutch pack itself. Thus through the use of a biasing or preloading member, the total torque throughput capability of such a clutch can be increased while maintaining the same package size, service life and operating parameters.

Thus it is the object of the present invention to provide a modulating clutch having an internal biasing or preloading member which provides torque throughput up to a predetermined threshold.

It is a further object of the present invention to provide a modulating clutch having a biasing or preloading member which couples the input and output up to a maximum torque level without consuming operating energy.

It is a still further object of the present invention to provide a modulating disc pack clutch having a predetermined torque throughput which can be increased by the activation of the clutch operator.

It is a still further object of the present invention to provide a modulating clutch which can provide increased torque throughput relative to pre-existing package size and service life constraints.

It is a still further object of the present invention to provide a modulating clutch having a biasing or preloading member which increases total torque throughput capability.

Further objects and advantages of the present invention will become apparent by reference to the following description of the preferred embodiment and appended drawings wherein like reference numbers refer to the same element, component or feature.

DESCRIPTION OF THE PREFERRED EMBODIMENT

Figure 1:
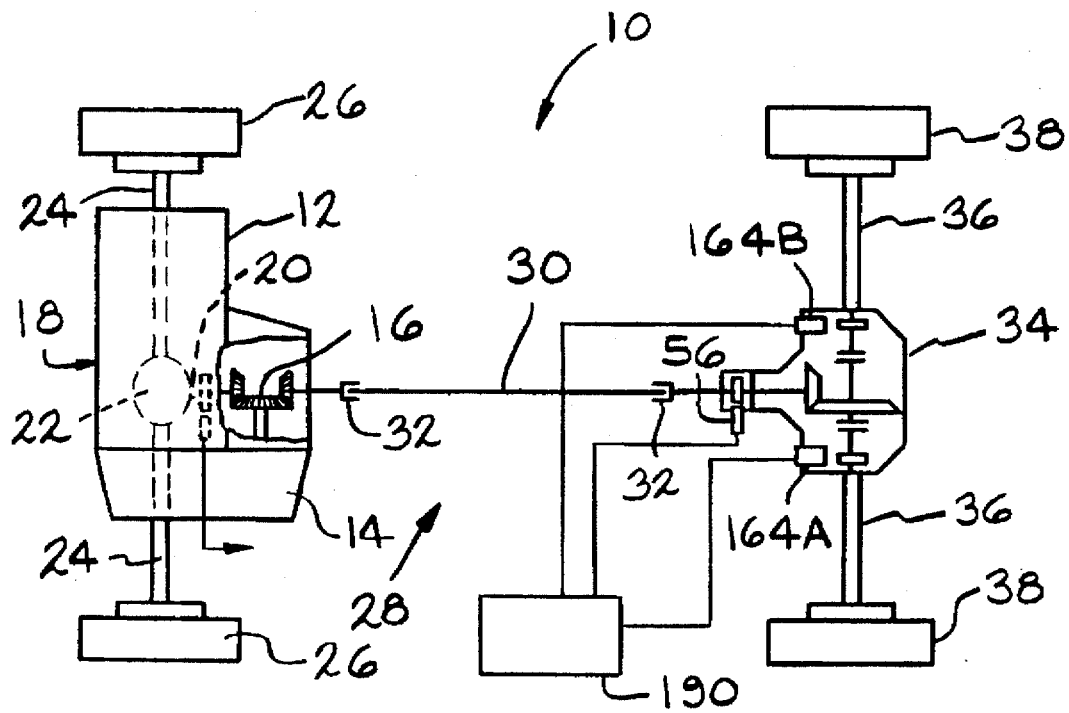
FIG. 1 is a diagrammatic view of a vehicle drive system for a four-wheel vehicle incorporating the dual clutch secondary driveline differential of the present invention.
Figure 4:
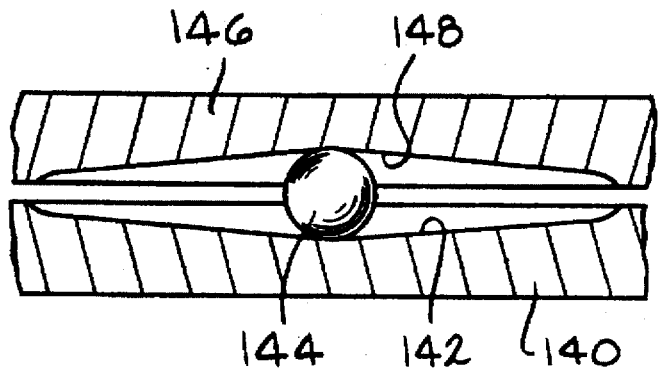
FIG. 4 is a flat pattern development of the ball ramp operators of the clutch according to the present invention taken along line 4—4 of FIG. 3.

Referring now to FIG. 1, an adaptive four-wheel vehicle drive train is diagrammatically illustrated and designated by the reference numeral 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front driveline 18 comprising a front or primary propshaft 20, a front or primary differential 22, a pair of live front axles 22 and respective pair of front or primary tire and wheel assemblies 26. The beveled or spiral beveled gear set 16 also provides motive power to a secondary or rear driveline 28 comprising a secondary propshaft 30 having appropriate universal joints 32, a rear or secondary differential 34, a pair of live secondary or rear axles 36 and a respective pair of secondary or rear tire and wheel assemblies 38.

The foregoing description relates to a vehicle wherein the primary driveline 18 is disposed at the front of the vehicle and, correspondingly, the secondary driveline 28 is disposed at the rear of the vehicle, such a vehicle commonly referred to as a front wheel drive vehicle. The designations "primary" and "secondary" herein refer to drivelines providing drive torque at all times and drivelines providing supplemental or intermittent torque, respectively. These designations (primary and secondary) are utilized rather than front driveline and rear driveline inasmuch as the invention herein disclosed and claimed may be readily utilized with vehicles wherein the primary driveline 18 is disposed at the rear of the vehicle and the secondary driveline 28 and components within the secondary differential 34 are disposed at the front of the vehicle. Thus, the illustration in FIG. 1, wherein the primary driveline 18 is disposed at the front of the vehicle should be understood to be illustrative rather than limiting and that the components and arrangement of components illustrated is equally suitable and usable with a primary rear wheel drive vehicle.

Figure 2:
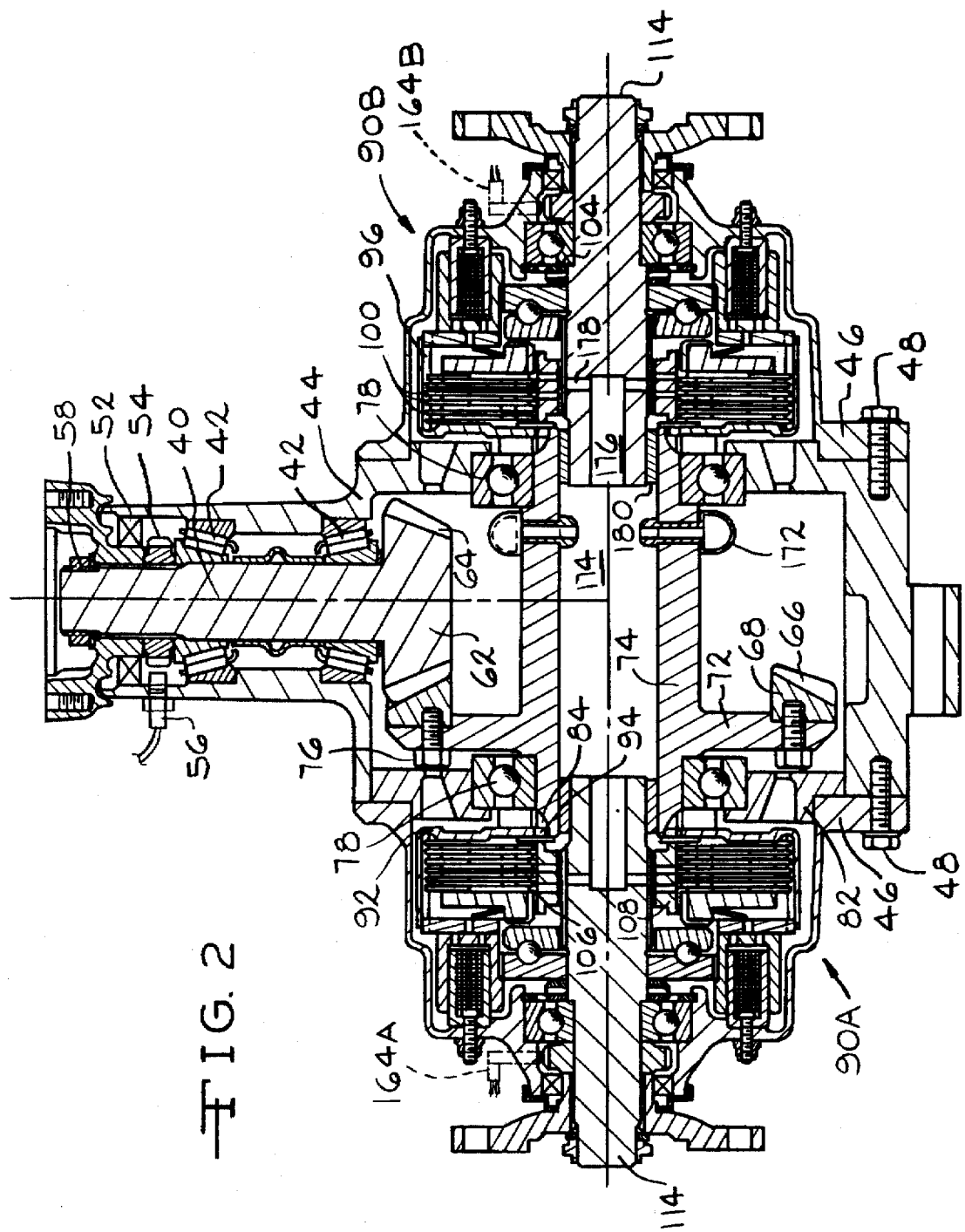
FIG. 2 is a full, sectional view of a dual clutch differential according to the present invention.

Referring now to FIGS. 1 and 2, the secondary differential 34 includes an input shaft 40 supported for rotation on suitable roller bearing assemblies 42 within a center housing 44. At each end of the center housing 44 is a bell housing 46 which is secured to the center housing 44 by a plurality of fasteners 48, two of which are illustrated in FIG. 2. Appropriately disposed oil seals 52 provide an appropriate fluid-tight seal between the input shaft 40 and the housing 44. A tone wheel 54 is also secured for rotation to the input shaft 40 and rotates therewith. A sensor 56 such as a variable reluctance or Hall effect sensor extends through the center housing 44 and senses rotation of the tone wheel 54. The input shaft 40 may also include male splines or other similar features which facilitate coupling to a universal joint 32 or other shaft or stub shaft which drives the input shaft 40.

Figure 3:
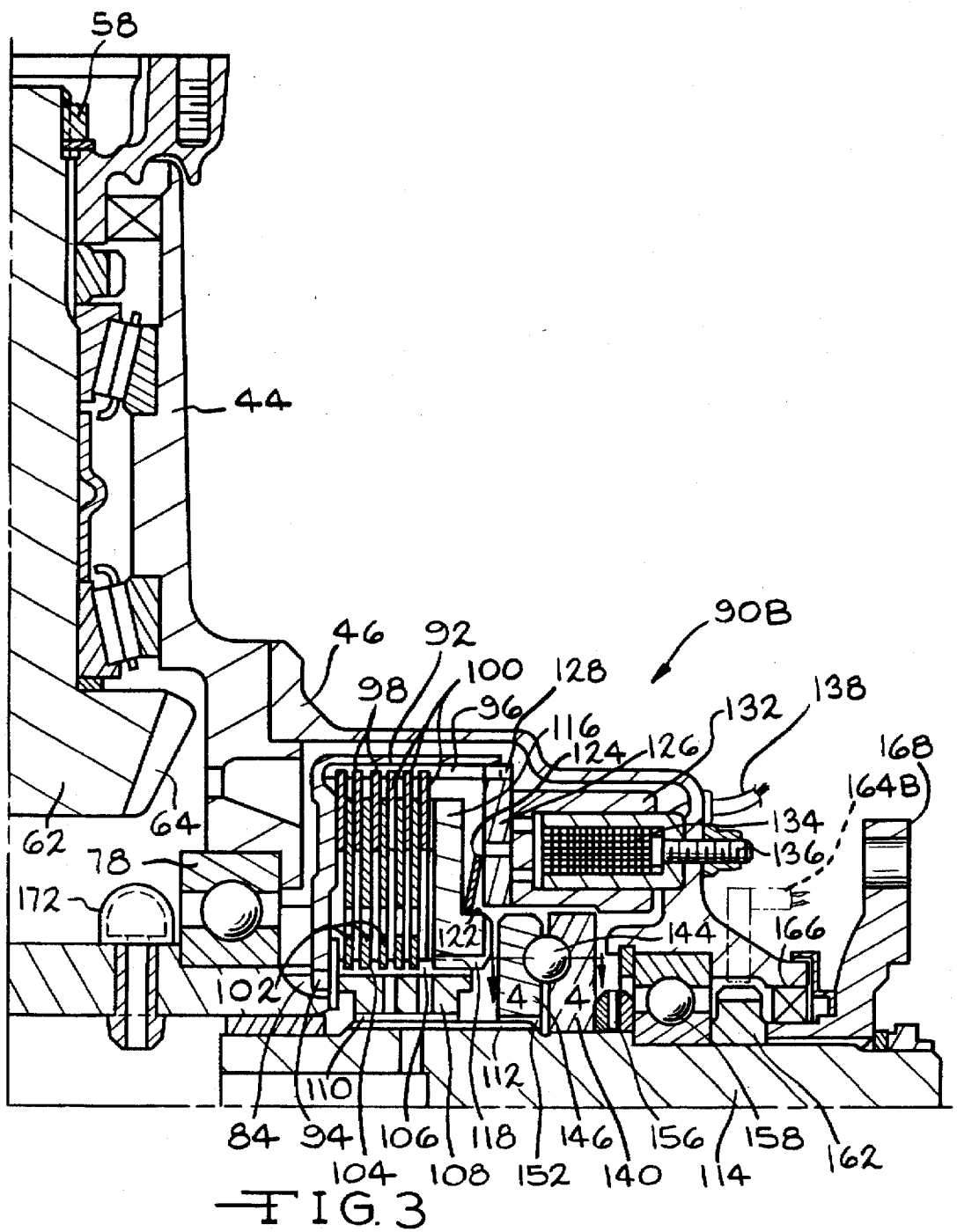
FIG. 3 is an enlarged, sectional view of a portion of a dual clutch differential according to the present invention.

The input shaft 40 terminates in a bevel gear 62 having gear teeth 64 which mate with complementarily configured gear teeth 66 on a ring gear 68 secured to a flange 72 on a centrally disposed tubular drive member 74 by suitable fasteners 76. The tubular drive member 74 is supported by a pair of anti-friction bearings such as the ball bearing assemblies 78 which are seated within the center housing 44 on an annular spacer 82 disposed within the center housing 44. At each end of the tubular drive member 74 are sets of male splines or gear teeth 84. Within each of the pair of bell housings 46 is a respective one of a pair of modulating clutch assemblies 90A and 90B. But for the opposed, mirror-image arrangement of the two modulating clutch assemblies 90A and 90B, the components of the two clutch assemblies 90A and 90B described below they are identical and thus only the modulating clutch assembly 90B disposed on the right of FIG. 2 and in FIG. 3 will be fully described, it being understood that the left modulating clutch assembly 90A is in all significant respects identical to the right modulating clutch 90A.

Each of the modulating clutch assemblies 90A and 90B include a clutch end bell 92. The clutch end bells 92 are identical but disposed in a mirror image relationship on opposite ends of the tubular drive member 74. Each of the clutch end bells 92 includes a plurality of female splines or gear teeth 94 formed in the end wall which are complementary to the male splines or gear teeth 84 on the tubular drive member 74. The interior, circumferential surface of the bell housing 92 defines a plurality of axially extending female splines 96 which are engaged by and rotationally drive complementary male splines 98 disposed on a first plurality of clutch plates 100. The first plurality of clutch discs or plates 100 include suitable frictional material and surfaces and are interleaved with a second, smaller diameter plurality of clutch discs or plates 102 also including suitable frictional material and surfaces and having female splines 104 which engage and rotationally drive complementary male splines 106 disposed upon a clutch collar 108. The clutch collar 108 in turn includes female splines or gear teeth 110 which mate with complementarily configured male splines or gear teeth 112 disposed on the output shaft 114B.

The disc pack clutch assembly 90B also includes a circular apply plate 116 which includes internal splines or gear teeth 118 which mate with the male splines 106 on the clutch collar 108. The apply plate 116 thus rotates with the second plurality of clutch plates 102 and may move axially relative thereto. The apply plate 116 includes a shoulder 122 which positions and receives a Belleville spring 124. The Belleville spring provides a compressive preload or bias to the first and second pluralities of clutch plates 100 and 102 such that a nominal maximum torque of 150 pounds-feet may be transmitted through the clutches 90A and 90B before slip occurs. The maximum torque threshold through each clutch assembly 90A and 90B may be adjusted up or down by 50% or more, e.g., 75 pounds-feet to 225 pounds-feet by, for example, adjustment of the compressive force provided by the Belleville spring 124, to suit typical automotive, 4 WD vehicle and SUV applications.

In a typically sized clutch pack, the nominal torque transfer achievable by actuator compression of the disc clutch pack is on the order of 350 pounds-feet. The torques are additive and thus the total torque of the disc pack clutch assembly 90A and 90B equipped with the Belleville spring 124 will be on the order of 500 pounds-feet.

The Belleville spring 124 is disposed between the apply plate 116 and an armature 126. The armature 126 include male splines or gear teeth 128 about its periphery which are complementary to and engage the female splines 96 on the interior of the end bell 92. Thus, the armature 126 rotates with the end bell 92 and the first plurality of clutch plates 100. The armature 126 is disposed adjacent a U-shaped circular coil housing 132. The coil housing 132 generally surrounds a stationary electromagnetic coil 134 which is secured to the housing end bell 46 by a plurality of threaded studs and fasteners 136. Electrical energy may be provided to the electromagnetic coil 134 through a conductor 138.

Coupled to the coil housing 132 by any suitable means such as weldments, interengaging splines or an interference fit is a first circular member 140. The first circular member 140 defines a loose, freely rotating fit about the output shaft 114B and thus the first circular member 140 and the coil housing 132 are free to rotate about both the output shaft 114B and the electromagnetic coil 134. The first circular member 140 includes a plurality of ramp-like recesses 142 arranged in a circular pattern about the axis of the output shaft 114B. The recesses 142 represent an oblique section of a helical torus. Disposed within each of the recesses 142 is a load transferring ball 144 or similar load transferring member which rolls along the ramps defined by the oblique surfaces of the recesses 142. A second circular member 146 is disposed in opposed relationship with the first circular member 140 and includes a like plurality of complementarily sized and arranged recesses 148. The load transferring balls 144 are thus received and trapped within the pairs of opposing recesses 142 and 148, the ends of the recesses being curved and much steeper in slope than the interior regions of the recesses 142 and 148 such that the load transferring balls 144 are effectively trapped in the regions defined thereby.

It will be appreciated that the recesses 142 and 148 and the load transferring balls 144 may be replaced with other analogous mechanical elements which cause axial displacement of the circular members 140 and 146 in response to relative rotation therebetween. For example, tapered rollers disposed in complementarily configured conical helices may be utilized.

An important design consideration of the recesses 142 and 148 and the load transferring balls 144 is that the geometry of their design and the design of the Belleville spring 124 and the clearances in the clutch assembly overall ensure that the clutch assemblies 90A and 90B are not self-locking. The electromagnetic clutch assemblies 90A and 90B must not self-engage but rather must be capable of modulating clamping of the clutch plates 100 and 102 and torque transfer in direct, proportional response to the input to the electromagnetic coil 134.

The second circular member 146 includes a plurality of female splines or gear teeth 152 which are complementary to and engage the male splines or gear teeth 112 on the output shaft 114. The axial position of the first circular member 140 is established by a thrust bearing 156 which is disposed adjacent a ball bearing assembly 158. Each of the output shafts 114A and 114B include a tone wheel 162A and 162B. Disposed in adjacent, sensing relationship with each of the tone wheels 162A and 162B is a variable reluctance or Hall effect sensor 164A and 164B. The sensors 164A and 164B provide signals which may be utilized by suitable electronic equipment to compute the speed of the left and right output shafts 114A and 114B, respectively. Oil seals 166 are also disposed between the output shafts 114A and 114B and the housing end bells 46. Finally, output flanges 168 may be secured by suitable splines or other interconnecting means to the output shafts 114 to facilitate coupling of the output shafts 114 to associated components in the rear axles 36 of the secondary driveline 28.

In order to provide appropriate cooling for the components of the secondary driveline differential 34 and specifically of the modulating clutch assemblies 90A and 90B, the interior portion of the housing 44 forms a sump within which a lubricating and cooling fluid may be disposed. A pair of scavengers or scoops 172 having a mouth open toward the forward direction of rotation of the tubular drive member 74 extend radially therefrom. As the tubular drive member 74 rotates, the scoops 172 collect and drive lubricating and cooling fluid inwardly to a centrally dispose, hollow chamber 174 in the tubular drive member 74. Fluid then travels through axial passageways 176 in the output shafts 114 and thence through radial passageways 178 and into the region of the differential 34 occupied by the modulating clutch assemblies 90A and 90B. Heat generated in the modulated clutch assemblies 90A and 90B is thus transferred to the circulating lubricating and coolant fluid and dispersed throughout the secondary differential 34.

Operation of the secondary driveline differential 34 and, specficially, the modulating clutch assemblies 90A and 90B, may comprehend common operation, i.e., both clutch assemblies 90A and 90B driven by the same control signal or individual operation, for example, wherein individual control signals control torque delivery to each individual secondary tire and wheel assembly 38 to compensate for or correct left-right speed differences. Furthermore, the passive torque throughput threshold of the differential 34 provides operation comparable to that of a limited slip differential without energizing the electromagnetic coils 134. Energization of such coils 134 then allows the control in delivery of torque to both or each individual secondary wheel 38 at higher levels determined by the degree of clutch activation.

The foregoing disclosure is the best mode devised by the inventor for practicing this invention. It is apparent, however, that apparatus and methods incorporating modifications and variations will be obvious to one skilled in the art of vehicle clutches and drivelines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A clutch for use in a differential or transfer case of a four-wheel drive vehicle comprising, in combination, an input member, an output member, a modulating clutch assembly disposed between said input member and said output member, said modulating clutch having a first plurality of clutch discs disposed for rotation with said input member, a second plurality of clutch discs interleaved with said first plurality of clutch discs and disposed for rotation with said output member, a clutch operator for adjustably compressing said first and said second pluralities of clutch discs, said clutch operator having an assembly including a pair of opposed members defining a plurality of ramped recesses, a like plurality of load transferring members disposed in a respective one of said recesses and an electromagnetic coil for retarding rotation of one of said opposed members, and means for compressing said first and said second pluralities of clutch discs to provide a predetermined level of frictional coupling between said input member and said output member.

2. The clutch of claim 1 wherein said means for compressing is a passive, non-adjustable spring.

3. The clutch of claim 1 wherein said means for compressing is a Belleville spring.

4. The clutch of claim 1 wherein said frictional coupling is between 100 and 200 pounds-feet.

5. The clutch of claim 1 further including a second output member and second modulating clutch driven by said input member and driving said second output member.

6. A differential for use in a four-wheel drive vehicle comprising, in combination, an input member, a pair of output members, and a pair of modulating clutch assemblies, each of said modulating clutches having a first plurality of clutch discs disposed for rotation with said input member, a second plurality of clutch discs interleaved with said first plurality of clutch discs and disposed for rotation with said output member, a clutch operator for compressing said first and said second pluralities of clutch discs, said clutch operator having an assembly including a pair of opposed members defining a plurality of ramped recesses, and a like plurality of load transferring members disposed in a respective one of said recesses and an electromagnetic coil for retarding rotation of one or aid opposed members, and means for operably associated with said pluralities of clutch discs providing a predetermined level of frictional coupling between said input member and said output member.

7. The differential of claim 6 wherein said means for providing is a Belleville spring.

8. The differential of claim 6 wherein said frictional coupling is between 75 pounds-feet and 225 pounds-feet.

9. The differential of claim 6 wherein said clutch operator includes an electromagnetic coil.

10. The differential of claim 6 wherein said means for providing is a non-adjustable spring.

11. A differential for use in an adaptive four-wheel drive vehicle comprising, in combination, an input shaft, a drive member disposed perpendicularly to said input shaft, a gear set for transferring rotational energy from said input shaft to said drive member, a pair of output shafts aligned with said drive member and a pair of modulating clutch assemblies, one of said pair of modulating clutch assemblies disposed between and selectively coupling each of said output shafts with said drive member, each of said modulating clutches including a disc pack and first operator for adjustably compressing said disc pack, said first operator having an assembly including a pair of opposed members defining a plurality of ramped recesses, a like plurality of load transferring members disposed in a respective one of aid recesses and an electromagnetic coil for retarding rotation of one of said opposed members, and a second operator for providing a predetermined level of frictional coupling through said disc pack.

12. The differential of claim 9 wherein said second operator is a non-adjustable spring.

13. The differential of claim 9 wherein said second operator is a Belleville spring.

14. The differential of claim 9 wherein said frictional coupling is between 75 pounds-feet and 225 pounds-feet.

15. The differential of claim 9 further including a tone wheel disposed for rotation with each of said output shafts and sensing means disposed adjacent each of said tone wheels.

16. The differential of claim 9 further including fluid scavengers disposed upon said drive member.

* * * * *